US008618755B2

(12) United States Patent
Maier et al.

(10) Patent No.: US 8,618,755 B2
(45) Date of Patent: Dec. 31, 2013

(54) CONTROL DEVICE FOR A MOTOR AND METHOD FOR CONTROLLING SAID MOTOR

(75) Inventors: Thomas Maier, Neunburg v. Wald (DE);
Christoph Schikora, Regensburg (DE);
Thomas Wiercioch, Regensburg (DE)

(73) Assignee: Continental Automotive GmbH, Hannover (DE)

( * ) Notice: Subject to any disclaimer, the term of this patent is extended or adjusted under 35 U.S.C. 154(b) by 182 days.

(21) Appl. No.: 13/129,434

(22) PCT Filed: Oct. 23, 2009

(86) PCT No.: PCT/EP2009/063990
§ 371 (c)(1),
(2), (4) Date: Jun. 22, 2011

(87) PCT Pub. No.: WO2010/054922
PCT Pub. Date: May 20, 2010

(65) Prior Publication Data
US 2011/0241582 A1    Oct. 6, 2011

(30) Foreign Application Priority Data

Nov. 14, 2008    (DE) .......................... 10 2008 057 288

(51) Int. Cl.
*H02P 6/16*    (2006.01)
(52) U.S. Cl.
USPC . 318/400.04; 318/615; 318/667; 318/400.01; 318/400.14; 318/721; 700/56; 700/57; 324/207.2; 324/207.25
(58) Field of Classification Search
USPC .......... 318/400.01, 400.07, 700, 400.14, 567, 318/162, 719, 721, 603, 667, 615; 700/56, 700/57, 66; 324/207.2, 207.25
See application file for complete search history.

(56) References Cited

U.S. PATENT DOCUMENTS

| | | | | |
|---|---|---|---|---|
| 4,085,355 A * | 4/1978 | Fradella | ...................... | 318/703 |
| 5,457,366 A | 10/1995 | Wehberg et al. | | |
| 5,905,350 A * | 5/1999 | Hofbauer et al. | ............. | 318/601 |
| 6,465,975 B1 * | 10/2002 | Naidu | ........................... | 318/430 |
| 6,498,449 B1 | 12/2002 | Chen et al. | | |
| 6,498,451 B1 * | 12/2002 | Boules et al. | .................. | 318/661 |
| 6,919,702 B2 * | 7/2005 | Szulyk | ........................... | 318/599 |
| 7,022,975 B2 * | 4/2006 | Horton | ...................... | 250/231.14 |

(Continued)

FOREIGN PATENT DOCUMENTS

DE       4310260 C1     9/1994
DE    102004013242 A1   10/2005

(Continued)

*Primary Examiner* — Rita Leykin
(74) *Attorney, Agent, or Firm* — Laurence A. Greenberg; Werner H. Stemer; Ralph E. Locher

(57) ABSTRACT

A control device is for a motor, especially a brushless DC motor. The control device contains a bridge circuit for generating a rotating field for the motor and a sensor system for detecting a position of a rotor of the motor, a control signal for the bridge circuit being derivable from the signal representing the rotor position. The sensor system includes an absolute value transmitter which detects the absolute position of the rotor and which is configured to derive at least one incremental signal from the absolute position and to make it directly available to a control component for controlling the bridge circuit for commuting the motor.

20 Claims, 2 Drawing Sheets

(56) References Cited

U.S. PATENT DOCUMENTS

| | | | |
|---|---|---|---|
| 7,023,203 B2 * | 4/2006 | Miyashita et al. | 324/207.25 |
| 7,170,279 B2 * | 1/2007 | Haas et al. | 324/207.25 |
| 7,376,525 B2 * | 5/2008 | Desailly et al. | 702/72 |
| 7,696,712 B2 * | 4/2010 | Cooper et al. | 318/602 |
| 7,719,216 B2 | 5/2010 | Sato et al. | |
| 7,816,881 B2 * | 10/2010 | Wiegers et al. | 318/638 |
| 7,834,618 B2 * | 11/2010 | Moura et al. | 324/207.26 |
| 2004/0004471 A1 * | 1/2004 | Haas et al. | 324/207.2 |
| 2004/0036427 A1 | 2/2004 | Mitchell | |
| 2004/0095089 A1 | 5/2004 | Collier-Hallman | |
| 2007/0267990 A1 | 11/2007 | Abolhassani et al. | |
| 2012/0068694 A1 * | 3/2012 | Mitamura et al. | 324/207.25 |

FOREIGN PATENT DOCUMENTS

| | | |
|---|---|---|
| JP | 2003510002 A | 3/2003 |
| JP | 2007135400 A | 5/2007 |
| JP | 2007300727 A | 11/2007 |
| JP | 2008086180 A | 4/2008 |

* cited by examiner

CONTROL DEVICE FOR A MOTOR AND METHOD FOR CONTROLLING SAID MOTOR

BACKGROUND OF THE INVENTION

Field of the Invention

The invention relates to a control apparatus for a motor, in particular for a brushless direct-current motor, which comprises a bridge circuit for production of a rotating field for the motor and a sensor system for detection of a position of the rotor of the motor, in which case a drive signal for the bridge circuit can be derived from a signal which represents the rotor position.

The invention also relates to a method for controlling a motor, in particular a brushless direct-current motor, in which a bridge circuit produces a rotating field for the motor and a sensor system detects a position of a rotor of the motor, and a drive signal for the bridge circuit is derived from a signal which represents the rotor position.

Motors, in particular brushless direct-current motors (brushless DC motor, BLDC motor) are frequently used as a drive or as an actuating element in motor vehicle applications. By way of example, a brushless direct-current motor is used as an actuating element in a motor vehicle transmission. In this case, said motor is generally driven by known and low-cost block commutation. In some applications, the motor is controlled by regulating the rotation speed and the position of the rotor of the motor. Stringent requirements exist with respect to the torque, the rotation speed and the resolution of the position.

FIG. 1 shows the principle of a known control apparatus for a brushless direct-current motor, for example as an actuating element for a motor vehicle transmission, in which said block commutation is used.

Block commutation makes use of three Hall sensors or switches 3-1, 3-2, 3-3 in a sensor system 3, which detect the position of the rotor of the motor 2. For this purpose, the three Hall sensors 3-1, 3-2, 3-3 are arranged at a predetermined angle with respect to one another around the rotor shaft. In the case of a motor with four pairs of poles, the Hall sensors are each offset through 15° with respect to one another. Depending on the rotor position detected by the Hall sensors, a microcontroller 4, to which each of the Hall sensor 3-1, 3-2, 3-3 supplies an incremental signal H1, H2, H3, drives a corresponding switching element combination of a bridge circuit 6 for commutation of the motor 2 (cf. the drive signal s10). The bridge circuit 6 typically comprises a B6 bridge with a total of 6 switching elements (for example MOSFETs), as well as the respective drivers for the switching elements. The bridge circuit 6 then produces the rotating field which is required for operation of the motor 2 (cf. reference symbol 8).

The microcontroller control of the motor commutation results in a high processor load, since one interrupt is initiated for each Hall state change in the microcontroller 4. For this reason, the processor load may become very high when the motor rotation speed is high and when a plurality of motors are being driven at the same time. For example, a plurality of motors have to be driven for a motor vehicle transmission, in which case at least one clutch, which is driven by a dedicated motor, is also operated whenever a gear shift is made.

Furthermore, a superordinate process for position and rotation-speed regulation of the motor 2 runs on the microcontroller 4, and is called up as a regular task via a task-based operating system. The control system uses the incremental signals H1, H2, H3 produced by the Hall sensors 3-1, 3-2, 3-3 as an input variable, and uses them to derive the position and rotation speed of the motor 2.

The control apparatus allows pre-commutation of the motor 2. The pre-commutation is carried out by the microcontroller 4 which, for this purpose, evaluates the incremental signals H1, H2, H3 from the Hall sensors 3-1, 3-2, 3-3, and defines the time of commutation, and therefore the angle offset, as a function of the rotation speed. However, pre-commutation is possible only in synchronism with the motor commutation. Furthermore, this can be done only in one rotation direction of the motor, and is dependent on the rotation speed.

As has become clear from the above description, the motor commutation results in a very high processor load on the microcontroller, which must therefore be very powerful, because a specific processor load must not be exceeded, for safety reasons. Furthermore, however, a very expensive microcontroller must be used for the control apparatus.

BRIEF SUMMARY OF THE INVENTION

One object of the present invention is therefore to specify a control apparatus for a motor, in particular a brushless direct-current motor, which makes it possible to use a simpler and lower-cost microprocessor. A further object of the present invention is to specify a method for controlling the motor, in particular the brushless direct-current motor, which allows motor commutation with a reduced processor load on a microcontroller.

The invention provides a control apparatus for a motor, in particular for a brushless direct-current motor. The control apparatus comprises a bridge circuit for production of a rotating field for the motor. It furthermore comprises a sensor system for detection of a position of a rotor of the motor, in which case a drive signal for the bridge circuit can be derived from a signal which represents the rotor position. According to the invention, the sensor system comprises an absolute value, which detects the absolute position of the rotor and is designed to derive at least one incremental signal (sH1, sH2, sH3) from the absolute position and to make this available directly to a drive module for driving the bridge circuit for commutation of the motor.

Instead of a microcontroller supplying the incremental signals to the control apparatus, the corresponding signals are supplied directly to a separate drive module for driving the bridge circuit. The microcontroller is therefore no longer loaded by the commutation, since this is done automatically via the absolute value transmitter in conjunction with the drive module. This makes it possible, in particular, to completely avoid the interrupts, which increase the processor load, in the microcontroller. It is therefore also easily possible to use a single microcontroller for driving and/or monitoring a plurality of motors.

The control apparatus expediently comprises a microcontroller to which the absolute value transmitter can supply an absolute position signal, which represents the absolute position, independently of the commutation. In particular, the microcontroller is designed to determine the position and rotation speed of the rotor from the absolute position signal, independently of the motor commutation. For example, in order to determine the position and rotation speed of the rotor, the last position of the rotor is determined before calling up a position and rotation-speed regulator which runs in the microcontroller. One advantage is that the position and the rotation speed of the rotor can be determined in the microcontroller, without any interrupts, thus making it possible to keep the processor load on the microcontroller low. Furthermore, the supply of an absolute position signal, which represents the absolute position, to the microcontroller offers the advantage that the position of the rotor can be detected with considerably higher resolution.

The principle which is used for the control apparatus according to the invention therefore comprises the provision of an absolute value transmitter as a sensor, and of a separate drive module for the bridge circuit, in which case the rotor position can be detected by the microcontroller, asynchronously with respect to the motor commutation.

Alternatively, the control apparatus is designed such that the drive module makes the rotor position, which has been derived from the at least one incremental signal, available to the microcontroller, independently of the commutation. For this purpose, the at least one incremental signal can be temporarily stored in the drive module. By way of example, the microcontroller can then access the at least one incremental signal by a memory access. In this refinement, it may be superfluous for the absolute value transmitter to supply the absolute position signal, which represents the absolute position, to the microcontroller.

According a further expedient refinement, the absolute value transmitter produces a simulated Hall signal as the incremental signal. It is particularly expedient for the absolute value transmitter to produce three incremental signals, since this allows the motor commutation to be carried out in a simple manner.

According to a further expedient refinement, the bridge circuit comprises exclusively switching elements, in particular semiconductor switching elements, for driving the motor. In this case, a driver for the switching elements is provided in the drive module. This refinement allows the bridge circuit to be produced to be simpler and to cost less, since the drive is "moved out".

In a further refinement, the at least one incremental signal which is produced contains a pre-commutation angle, which can be integrated by the absolute value transmitter in the respective incremental signal. In this case, the pre-commutation angle can be set or predetermined by the absolute value transmitter, by the microprocessor or by the drive module as a function of the rotation direction of the rotor. In contrast to the prior art, the control apparatus according to the invention allows a pre-commutation angle to be provided in both rotation directions, thus enhancing the flexibility during operation of the motor. In particular, the pre-commutation angle can even be set or predetermined by the absolute value transmitter, by the microprocessor or by the drive module when the rotor is stationary and/or when the motor is being operated dynamically. Stating that the rotor is stationary means that its rotation speed is zero. The provision of a pre-commutation angle when the rotor is stationary makes it possible to make use of the reluctance torque when the motor is stationary. Setting a pre-commutation angle when the motor is being operated dynamically makes it possible to utilize the motor field-weakening mode. In this case, the pre-commutation angle can be varied as a function of the rotation speed of the motor, thus allowing particularly high flexibility.

The motor can be controlled particularly well if the absolute value transmitter has a resolution of better than 15°, in particular of down to 1°. Higher resolution of 15°, as is possible, for example in the prior art only by using three Hall sensors, results in major advantages for the calculation of the rotation speed, in particular at low rotation speeds. Furthermore, the positioning can also be determined more accurately since, in particular, it is possible to determine positions between two Hall sensors, which cannot be determined using conventional Hall sensors.

According to a further expedient refinement, circuit components for commutation of the motor are provided in the drive module. This means that the commutation can be carried out by hardware components. In contrast to this, the motor commutation in the prior art is carried out by the micro-controller, and therefore by software. However, as already described in the introduction, this results in the disadvantage of interrupts, thus disadvantageously increasing the processor load.

The invention furthermore provides a method for controlling a motor, in particular a brushless direct-current motor, in which a bridge circuit produces a rotating field for the motor and a sensor system detects a position of a rotor of the motor, and a drive signal for the bridge circuit is derived from a signal which represents the rotor position. According to the invention, an absolute value transmitter in the sensor system detects an absolute position of the rotor. At least one incremental signal is derived from the absolute position and is made available directly to a drive module for driving the bridge circuit for commutation of the motor. This allows the bridge circuit to be commutated directly via the sensor system, that is to say the absolute value transmitter, without any load on the microcontroller, in which case the rotor position can be made available to the microcontroller asynchronously, that is to say independently of the commutation. In addition, the method according to the invention is associated with the same advantages as those which have been explained above in conjunction with a control apparatus according to the invention.

According to one expedient refinement, the absolute value transmitter supplies an absolute position signal, which represents the absolute position, to a microcontroller independently of the commutation.

According to a further expedient refinement, the microcontroller determines the position and rotation speed of the rotor from the absolute position signal, independently of the motor commutation. For this purpose, the last position of the rotor is determined before calling up a position and rotation-speed regulator which runs on the microcontroller. The position and rotation speed can advantageously be determined in the microcontroller without any interrupts.

In a further expedient refinement, the drive module makes the rotor position, which has been derived from the at least one incremental signal, available to the microcontroller independently of the commutation. In this case, there may be no need for the absolute position signal, which represents the absolute position, to be supplied to the microcontroller.

Expediently, the absolute value transmitter produces a simulated Hall signal as the incremental signal. It is also expedient for the absolute value to produce three incremental signals, thus allowing the motor commutation to be carried out in a conventional manner.

According to a further expedient refinement, a pre-commutation angle is taken into account in the at least one incremental signal which is produced, and is integrated by the absolute value transmitter in the respective incremental signal. In this case the pre-commutation angle is set or predetermined by the absolute value transmitter, by the microprocessor or by the drive module as a function of the rotation direction of the rotor. In particular, the pre-commutation angle is set or predetermined by the absolute value transmitter, by the microprocessor or by the drive module when the rotor is stationary and/or when the motor is being operated dynamically, which on the one hand allows the use of the reluctance torque when stationary and on the other hand allow the field-weakening mode to be used when the rotor is being operated dynamically. In particular, the pre-commutation angle can be varied as a function of the rotation speed of the motor.

The invention will be explained in more detail in the following text with reference to one exemplary embodiment in the drawing, in which:

DESCRIPTION OF THE INVENTION

Figure 1:
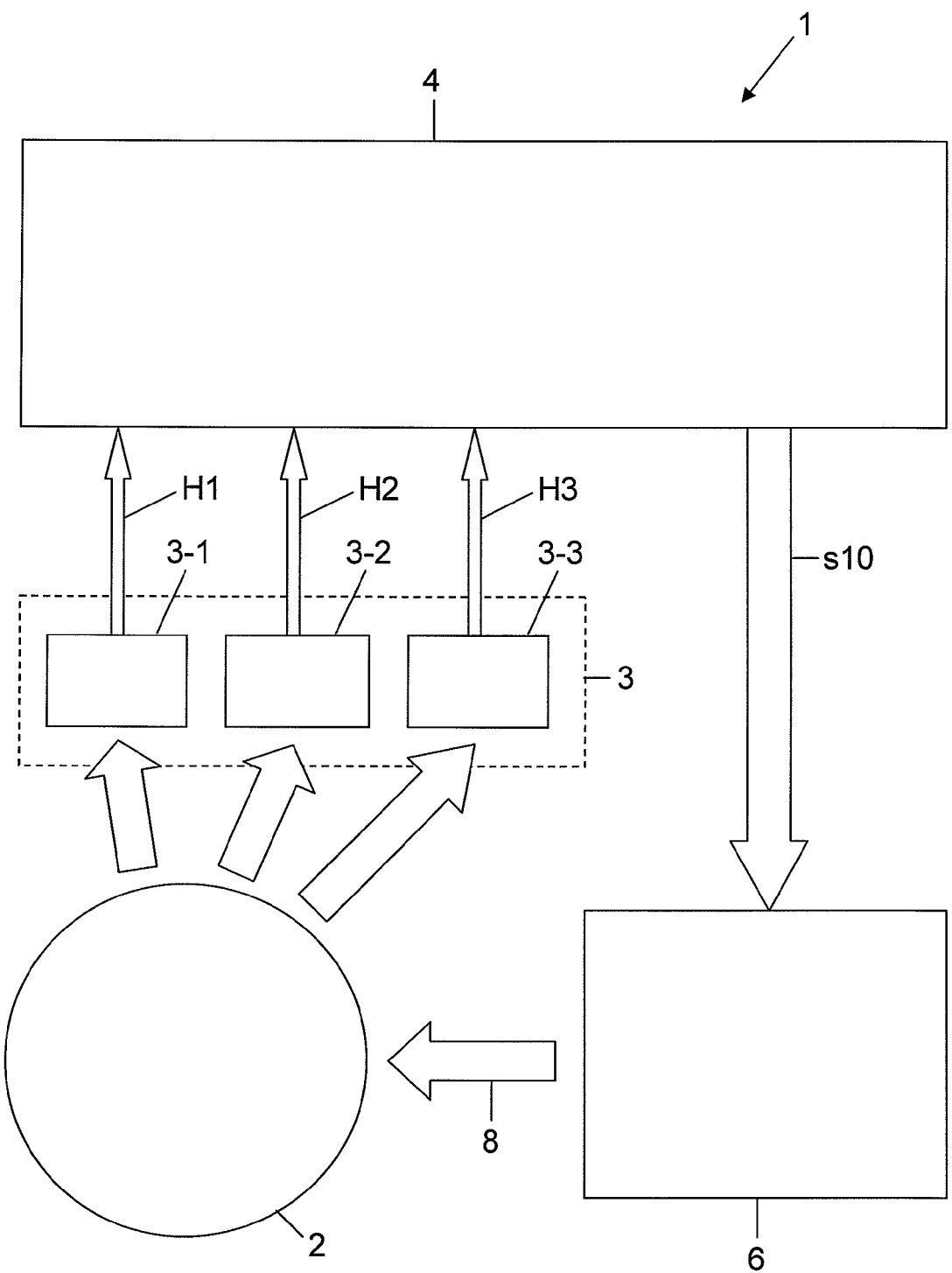
FIG. 1 shows a known control apparatus, which has already been described, for a brushless direct-current motor.
Figure 2:
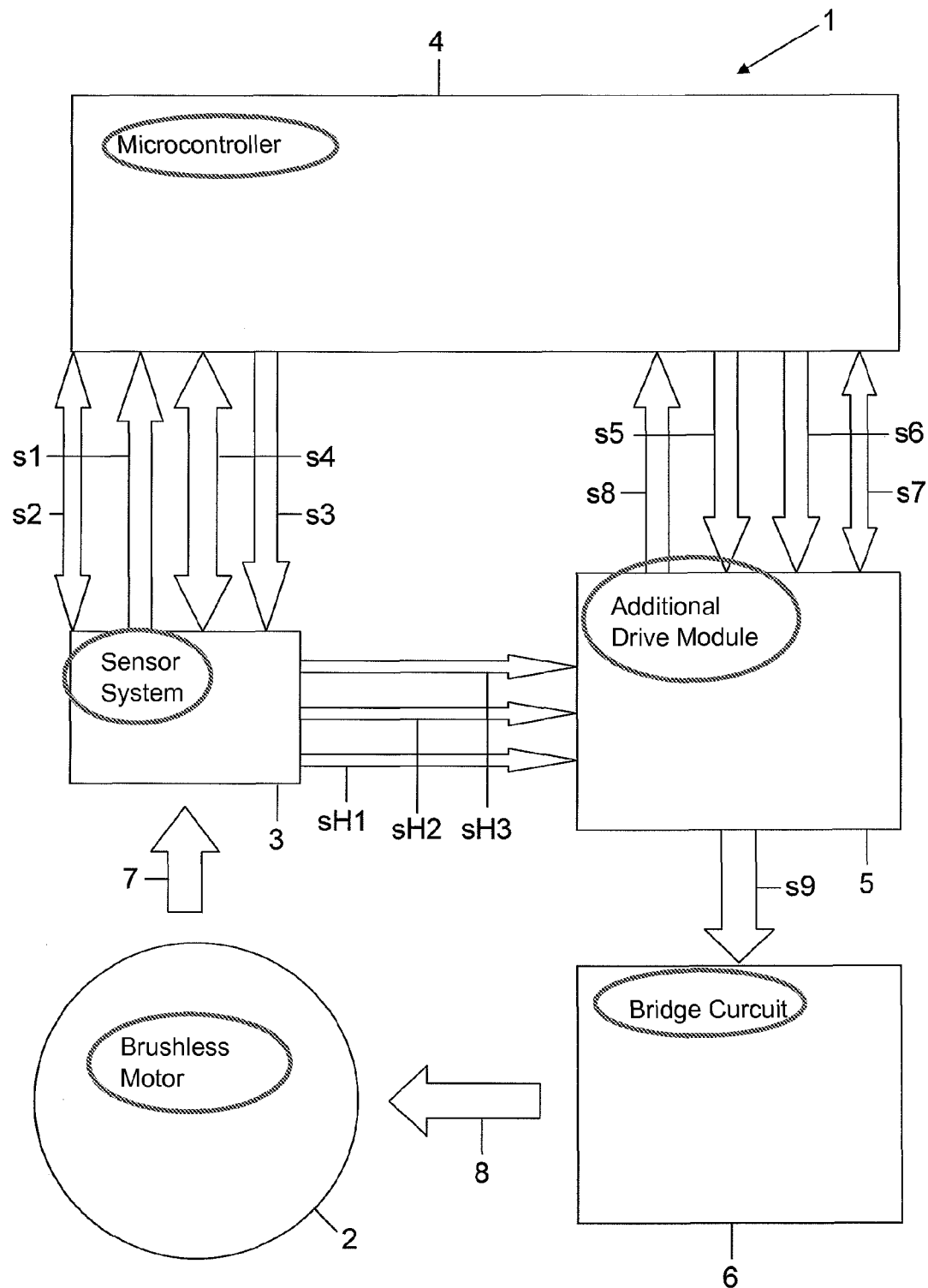
FIG. 2 shows a control apparatus according to the invention for a motor, in particular a brushless direct-current motor.

FIG. 1 shows an already known control apparatus 1, which has already been described, for a brushless direct-current motor 2. A control apparatus 1 according to the invention for a brushless direct-current motor 2 is based on the already described principle, but uses a different sensor system 3 and an additional drive module 5 for driving the bridge circuit 6 for commutation of the brushless direct-current motor 2 (motor).

In the control apparatus 1 according to the invention, the sensor system 3 is formed by an absolute value transmitter 3. This is designed to derive at least one incremental signal sH1, sH2, sH3 from the absolute position and to make this available directly to the drive module 5 in order to drive the bridge circuit 6 for commutation of the motor. On the one hand, the drive module 5 has circuit components for commutation of the motor 2, such that the motor commutation can be provided by hardware components. On the other hand, the drive module 5 comprises a driver for the switching elements of the bridge circuit 6, such that the latter can be produced in a simpler and less costly manner.

In addition to the three incremental signals sH1, sH2, sH3, the absolute value transmitter 3 makes an absolute position signal s1 available to the microcontroller 4 in the control apparatus. The high-resolution absolute position can be read directly by the microcontroller 4, thus allowing it to detect the rotor position with considerably greater resolution, independently of the motor commutation and therefore without interrupts. Before a position and rotation-speed regulator which is arranged in the microcontroller 4 is called up, the last position of the rotor of the motor 2 is read, and the position and rotation speed of the rotor are determined from this.

Furthermore, SPI (Serial Peripheral Interface) communication takes place between the absolute value transmitter 3 and the microcontroller 4 for configuration of the absolute value transmitter 3. This is identified by s2. Direction-dependent pre-commutation can be carried out via a rotation-direction preset signal s3, by the absolute value transmitter 3 taking account of the appropriate pre-commutation angle in the simulated Hall signals sH1, sH2 and sH3. The absolute value transmitter 3 can transmit a feedback signal to the microcontroller 4, by means of a diagnosis signal s4.

s5 denotes a speed preset signal for the microcontroller 4 to the drive module 5. s6 represents a direction preset signal for the drive for the drive module 5. This processes the speed preset signal s5 and the direction preset signal s6, and appropriately drives the switching elements in the bridge circuit 6 in order to produce a rotating field 8. The drive signal for the bridge circuit 6 is identified by s9. The drive module 5 communicates with the microcontroller 4 via an SPI signal s7, and this communication may be bidirectional. In particular, the drive module 5 may in this case use the signal s8 to transmit the number of Hall changes to the microcontroller 4.

Taking account of the simulated Hall signals sH1, sH2, sH3 and the speed and direction preset signal s5, s6, the drive module 5 drives the bridge circuit 6 by means of the drive signal s9, following which the bridge circuit 6 produces the rotating field 8 for the motor 2 by appropriate commutation.

The invention offers the simple capability to provide pre-commutation for the motor, which leads to an increase in the performance of the motor and therefore results in major cost advantages. The difference from the solution known from the prior art, as shown in FIG. 1, is that the pre-commutation angle is not produced by software and therefore in synchronism with the rotation speed of the motor 2, but can be produced directly via the absolute value transmitter 3. This allows the pre-commutation angle to be set in the sensor as a function of the rotation direction and dynamically during operation. It is even possible to set the pre-commutation angle when the motor is stationary. For this purpose, the incremental signals sH1, sH2, sH3, which represent simulated Hall signals, and directly control the drive module 5 of the bridge circuit 6, are switched having been shifted through a specific angle. This allows the motor 2 to be pre-commutated as required.

A further advantage is that the pre-commutation angle is not dependent on the rotation speed, as in the case of a software-based solution, but, instead, a fixed pre-commutation angle can be chosen at a rotation speed of 0. This not only makes it possible to exploit the field-weakening range of motor at a relatively high rotation speed, but also allows a possible reluctance torque to be produced when stationary. This not only makes it possible to improve the performance of the motor 2 at a relative high rotation speed, at which it is operated in the field-weakening mode, but allows torque to be produced when the motor 2 is stationary, by making use of the reluctance torque.

In order to allow both the field-weakening range and the reluctance torque of the motor 2 to be used as well as possible, the following implementation can be chosen: in order to use the reluctance torque, when the control apparatus is started, or even during manufacture, a fixed, direction-dependent pre-commutation angle is set. This makes it possible to use the additional reluctance torque even when stationary, which is not possible with present-day software solutions.

After the motor 2 has been run up, the motor 2 can then be changed to the field-weakening range by dynamic adjustment of the pre-commutation angle, for example by means of the SPI (serial peripheral interface), thus increasing the maximum possible rotation speed. This can be done completely asynchronously with respect to the motor commutation, and can thus be done by the operating system of the microcontroller 4.

In addition, it is possible to determine the dynamic pre-commutation angle completely in the absolute value transmitter, in which case, in one appropriate embodiment of the absolute value transmitter, the microcontroller could be completely relieved of the task of pre-commutation.

It is likewise possible to determine the rotation-speed-dependent pre-commutation angle automatically in the drive module 5 for the bridge circuit 6. This means that only an adjustable fixed direction-dependent pre-commutation angle is provided in the absolute value transmitter. The dynamic rotation-speed-dependent pre-commutation angle is provided by the drive module 5 for the bridge circuit 6.

The invention therefore allows direct commutation of the bridge circuit 6 via the absolute value transmitter 3, without this resulting in a processor load on the microcontroller 4. The rotor position can be made available to the microcontroller 4 asynchronously, that is to say independently of the commutation.

Furthermore, the motor pre-commutation can be carried out via the absolute value transmitter and/or the drive module 5, thus making it possible to dispense with corresponding software in the microcontroller 4.

Furthermore, the use of an absolute value transmitter has a considerably better resolution down to 1°, thus making it possible to achieve advantages in rotation speed calculation and positioning. In particular, the rotation speed calculation is improved when the motor rotation speed is low. With regard to positioning, it is now also possible to determine positions which are between two real Hall sensors, as are used in the prior art.

The use of the field-weakening mode and the reluctance torque allows the motor performance to be increased further, or else the design of the motor to be minimized. Furthermore, the invention results in the advantage that the microprocessor 4 is relieved of the load of driving the bridge circuit 6, since this is done by hardware by the drive module 5, for example an ASIC.

The invention claimed is:

1. A control apparatus for a motor, including a brushless direct-current motor, the control apparatus comprising:
   a bridge circuit for producing a rotating field for the motor;
   a drive module; and
   a sensor system having an absolute value transmitter detecting an absolute position of a rotor of the motor, deriving at least one incremental signal from the absolute position, and making the at least one incremental signal available directly to said drive module for driving said bridge circuit for commutation of the motor; and
   a microcontroller, to which said absolute value transmitter supplies an absolute position signal, which represents the absolute position, independently of the commutation;
   and, wherein said absolute value produces a simulated Hall signal as the at least one incremental signal.

2. The control apparatus according to claim 1, wherein said microcontroller is configured to determine a position and a rotation speed of the rotor from the absolute position signal, independently of the motor commutation.

3. The control apparatus according to claim 1, wherein said drive module makes a rotor position, which has been derived from the at least one incremental signal, available to said microcontroller, independently of the commutation.

4. The control apparatus according to claim 1, wherein said absolute value transmitter produces three incremental signals.

5. The control apparatus according to claim 1, wherein:
   said bridge circuit contains exclusively switching elements, including semiconductor switching elements, for driving the motor; and
   said drive module has a driver for said switching elements.

6. The control apparatus according to claim 1, wherein the at least one incremental signal contains a pre-commutation angle, which can be integrated by said absolute value transmitter in a respective incremental signal.

7. The control apparatus according to claim 6, wherein said absolute value transmitter has a resolution of better than 15.

8. The control apparatus according to claim 6, wherein said absolute value transmitter has a resolution of down to 1°.

9. The control apparatus according to claim 6, wherein the pre-commutation angle can be set or predetermined by said absolute value transmitter, by said microcontroller or by said drive module in dependence on a rotation direction of the rotor.

10. The control apparatus according to claim 6, wherein the pre-commutation angle can be set or predetermined by said absolute value transmitter, by said microcontroller or by said drive module when the rotor is stationary or when the motor is being operated dynamically.

11. The control apparatus according to claim 6, wherein the pre-commutation angle can be varied as a function of a rotation speed of the motor.

12. The control apparatus according to claim 1, further comprising circuit components for commutation of the motor being disposed in said drive module.

13. A method for controlling a motor, including a brushless direct-current motor, which comprises the steps of:
   producing, via a bridge circuit, a rotating field for the motor;
   detecting, via a sensor system, a position of a rotor of the motor;
   deriving a drive signal for the bridge circuit from a signal which represents a rotor position;
   detecting, via an absolute value transmitter in the sensor system, an absolute position of the rotor; and
   deriving at least one incremental signal from the absolute position and making the at least one incremental signal available directly to a drive module for driving the bridge circuit for commutation of the motor; and
   supplying, via the absolute value transmitter, an absolute position signal, which represents the absolute position, to a microcontroller independently of the commutation; and producing, via absolute value transmitter, a simulated Hall signal as the incremental signal.

14. The method according to claim 13, wherein the microcontroller determines the position and a rotation speed of the rotor from the absolute position signal, independently of the motor commutation.

15. The method according to claim 13, wherein the drive module makes the rotor position, which has been derived from the at least one incremental signal, available to the microcontroller independently of the commutation.

16. The method according to claim 13, which further comprises producing, via the absolute value transmitter, three incremental signals.

17. The method according to claim 13, wherein a pre-commutation angle is taken into account in the at least one incremental signal which is produced, and is integrated by the absolute value transmitter in the respective incremental signal.

18. The method according to claim 17, wherein the pre-commutation angle is set or predetermined by the absolute value transmitter, by the microcontroller or by the drive module in dependence on a rotation direction of the rotor.

19. The method according to claim 17, wherein the pre-commutation angle is set or predetermined by the absolute value transmitter, by the microcontroller or by the drive module when the rotor is stationary and/or when the motor is being operated dynamically.

20. The method according to claim 17, which further comprises varying the pre-commutation angle in dependence on the rotation speed of the motor.

* * * * *